(12) United States Patent
Jayaraj

(10) Patent No.: US 8,283,907 B1
(45) Date of Patent: Oct. 9, 2012

(54) BOOST REGULATOR WITH PULSE FREQUENCY MODE OF OPERATION HAVING SUBSTANTIALLY CONSTANT PERCENTAGE OUTPUT RIPPLE AND FREQUENCY

(75) Inventor: Vinit Jayaraj, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 322 days.

(21) Appl. No.: 12/592,260

(22) Filed: Nov. 20, 2009

(51) Int. Cl.
*G05F 1/44* (2006.01)
(52) U.S. Cl. ........................................ 323/282; 323/285
(58) Field of Classification Search .................. 323/222, 323/273, 275, 280–285, 351
See application file for complete search history.

(56) References Cited

U.S. PATENT DOCUMENTS

| | | | |
|---|---|---|---|
| 4,245,286 A * | 1/1981 | Paulkovich et al. ....... 363/21.11 |
| 5,959,443 A | 9/1999 | Littlefield |
| 6,008,630 A * | 12/1999 | Prasad ........................... 323/222 |
| 6,215,288 B1 | 4/2001 | Ramsey et al. |
| RE37,609 E | 3/2002 | Bittner |
| 6,396,252 B1 | 5/2002 | Culpepper et al. |
| 7,102,339 B1 | 9/2006 | Ferguson |
| 7,245,113 B2 | 7/2007 | Chen et al. |
| 7,256,570 B2 | 8/2007 | Zhou et al. |
| 7,327,127 B2 | 2/2008 | Ho |
| 7,394,231 B2 | 7/2008 | Flatness et al. |
| 7,453,247 B2 | 11/2008 | de Cremoux |
| 2010/0045245 A1* | 2/2010 | Hawley ........................ 323/222 |

OTHER PUBLICATIONS

Hou-Ming Chen, et al., "A Monolithic Boost Converter with an Adaptable Current-Limited PFM Scheme", 2006 IEEE, p. 662-665.
Hou-Ming Chen, et al., "Low-Voltage Zero Quiescent Current PFM Boost Converter for Portable Devices", 2007 IEEE, p. 177-180.
Jing Wang, et al., "Design and Implementation of High-Efficiency and Low-Power DC-DC Converter with PWM/PFM Modes", 2007 IEEE, p. 596-599.
"1-Cell to 3-Cell, High Power (1.5A), Low-Noise, Step-Up DC-DC Converter", Maxim Integrated Products, Nov. 1998, p. 1-16.
"1.5µA IQ, Step-Up DC-DC Converters in Thin SOT23-5", Maxim Integrated Products, Jul. 2001, p. 1-12.

* cited by examiner

*Primary Examiner* — Adolf Berhane
(74) *Attorney, Agent, or Firm* — Alan A. R. Cooper; Wade James Brady, III; Frederick J. Telecky, Jr.

(57) ABSTRACT

A method includes receiving an input voltage at a voltage regulator and generating an output voltage using the voltage regulator, which includes an inductor. The method also includes controlling a current through the inductor using a current limit reference and modulating the current limit reference based on the input voltage and the output voltage. Modulating the current limit reference could include modulating a reference current based on a product of first and second input currents. The first input current may be based on the output voltage, and the second input current may be based on a difference between the output and input voltages. The voltage regulator may operate in a pulse frequency mode associated with a repetition rate. The repetition rate and a percentage ripple associated with the output voltage may be substantially constant over variations in the input voltage and variations in the output voltage.

13 Claims, 3 Drawing Sheets

BOOST REGULATOR WITH PULSE FREQUENCY MODE OF OPERATION HAVING SUBSTANTIALLY CONSTANT PERCENTAGE OUTPUT RIPPLE AND FREQUENCY

TECHNICAL FIELD

This disclosure is generally directed to voltage regulation. More specifically, this disclosure is directed to a boost regulator with a pulse frequency mode of operation having a substantially constant percentage output ripple and frequency.

BACKGROUND

Many systems use switching regulators to generate regulated voltages for use by other components. In a boost regulator, the regulator generates an output voltage $V_{OUT}$ that is higher than its input voltage $V_{IN}$. During light load conditions, some boost regulators enter a pulse frequency mode (PFM) of operation. In this mode, a boost regulator enters an operational state to delivery energy to a load and bring an output voltage $V_{OUT}$ into regulation. The boost regulator then enters a sleep state and waits for the output voltage $V_{OUT}$ to leave regulation. This process is repeated to maintain the output voltage $V_{OUT}$ substantially in regulation. However, conventional boost regulators that use a PFM mode of operation often have a variable percentage ripple (defined as $\Delta V_{OUT}/V_{OUT}$) and a variable repetition frequency.

SUMMARY

This disclosure provides a boost regulator with a pulse frequency mode of operation having a substantially constant percentage output ripple and frequency, as well as a related system and method.

In one non-limiting aspect of this disclosure, a method includes receiving an input voltage at a voltage regulator, where the voltage regulator includes an inductor. The method also includes generating an output voltage using the voltage regulator. The method further includes controlling a current through the inductor using a current limit reference. In addition, the method includes modulating the current limit reference based on the input voltage and the output voltage.

In a particular non-limiting aspect of this disclosure, modulating the current limit reference may include modulating a reference current, where the current limit reference is based on the reference current. The reference current can be based on a product of a first input current and a second input current. The first input current can be based on the output voltage, and the second input current can be based on the input and output voltages.

In a more particular non-limiting aspect of this disclosure, the first input current can be based on the output voltage, and the second input current can be based on a difference between the output voltage and the input voltage. Also, the reference current can be based on a square root of a product of (i) the output voltage and (ii) the difference between the output voltage and the input voltage.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
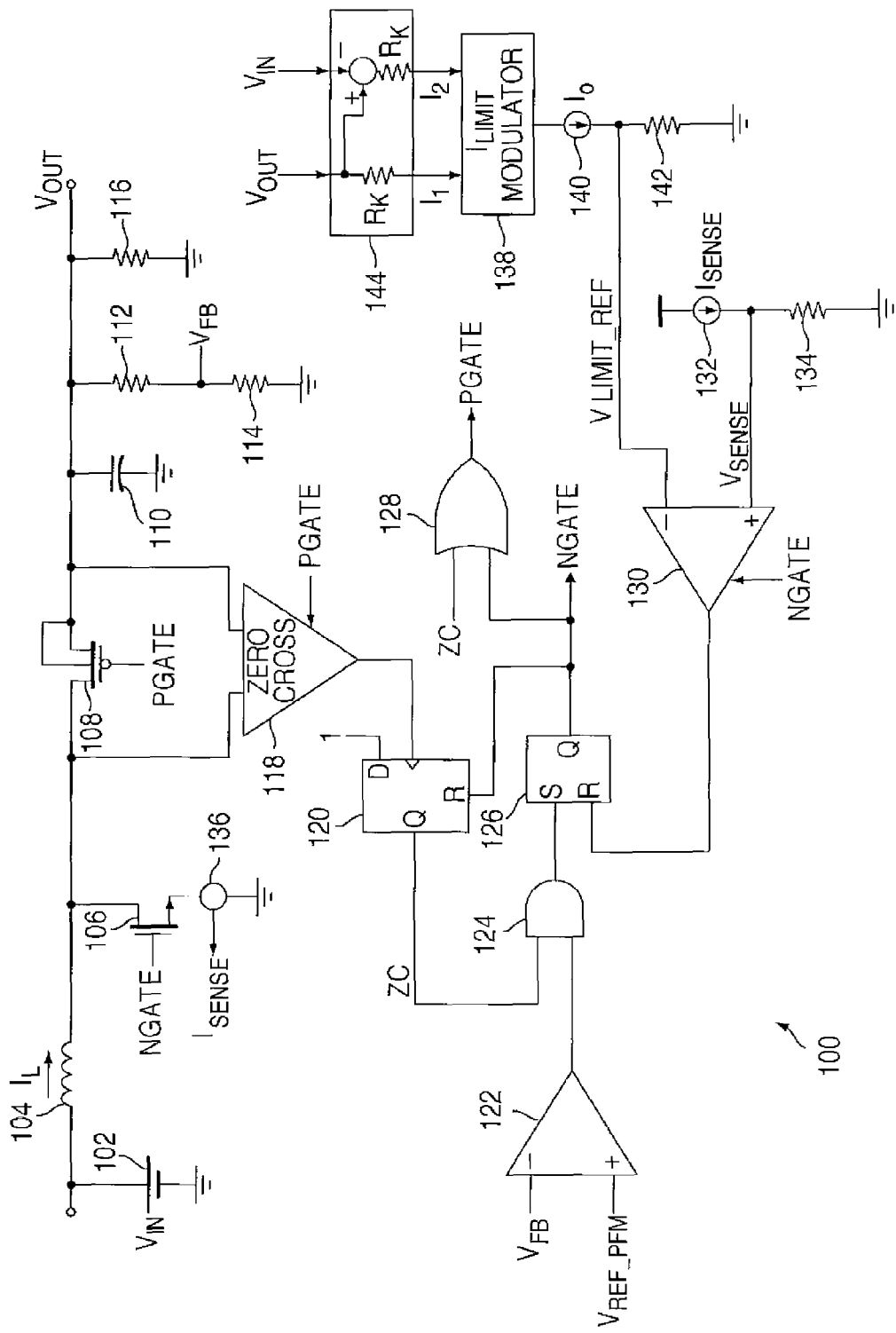
FIG. 1 illustrates an example boost switching regulator having a pulse frequency mode (PFM) of operation according to this disclosure.

FIG. 1 illustrates an example of a boost switching regulator 100 having a pulse frequency mode (PFM) of operation according to this disclosure. As shown in FIG. 1, the switching regulator 100 includes an input voltage source 102 that provides an input voltage $V_{IN}$. The input voltage source 102 represents any suitable source of an input voltage, such as a battery. The input voltage source 102 is coupled to an inductor 104, which represents any suitable inductive structure(s) having any suitable inductance. A current through the inductor 104 is denoted $I_L$. A transistor 106 is coupled to the inductor 104. The transistor 106 represents a switching device that can open and close to selectively couple the inductor 104 to ground. The transistor 106 represents any suitable switching device, such as an n-channel metal oxide semiconductor (NMOS) transistor. A transistor 108 represents another switching device that can open and close to selectively couple the inductor 104 to an output terminal where an output voltage $V_{OUT}$ is provided. The transistor 108 represents any suitable switching device, such as a p-channel metal oxide semiconductor (PMOS) transistor.

In this example, the transistor 108 is coupled to a filter capacitor 110. The capacitor 110 includes any suitable capacitive structure(s) having any suitable capacitance. The transistor 108 is also coupled to a first feedback resistor 112, which is coupled to a second feedback resistor 114. The feedback resistors 112-114 form a voltage divider that generates a feedback voltage $V_{FB}$. Each of the resistors 112-114 includes any suitable resistive structure(s) having any suitable resistance. The transistor 108 is further coupled to a light load resistor 116. The resistor 116 includes any suitable resistive structure(s) having any suitable resistance.

A zero-crossing comparator 118 is coupled across the transistor 108 and detects when the inductor current $I_L$ goes to zero. Since the inductor current $I_L$ can drop to zero, the switching regulator 100 can operate in discontinuous conduction mode (DCM). The zero-crossing comparator 118 includes any suitable structure for detecting a zero-crossing of a signal. An output of the zero-crossing comparator 118 is coupled to the clock input of a latch 120, which in this example represents a D flip flop having a "D" input coupled to a logic one value and an "R" input. The latch 120 includes any suitable structure for capturing and holding a value. An output of the latch 120 represents a zero-crossing signal ZC.

A comparator 122 compares the feedback voltage $V_{FB}$ generated by the resistors 112-114 to a PFM reference voltage $V_{REF\_PFM}$. The reference voltage $V_{REF\_PFM}$ defines when the switching regulator 100 needs to exit a low-power sleep state and begin providing energy to a load, which can be done to maintain regulation of the output voltage $V_{OUT}$ or to bring the output voltage $V_{OUT}$ back into regulation. The comparator 122 includes any suitable structure for comparing inputs. The output of the latch 120 and the output of the comparator 122 are coupled to an AND gate 124. The AND gate 124 includes any suitable structure for performing logical AND operations.

The switching regulator 100 also includes a bistable latch 126, which in this example represents a set-reset latch. The "S" input of the latch 126 is coupled to the AND gate 124, and the "R" input of the latch 126 receives a signal associated with a limit placed on the inductor current $I_L$. The output of the latch 126 is provided to the "R" input of the latch 120. The latch 126 includes any suitable structure for performing bistable latching.

The output of the latch 126 is provided as an NGATE control signal to the gate of the transistor 106. An OR gate 128 receives the zero-crossing signal ZC and the NGATE control signal and generates a PGATE control signal. The PGATE control signal is provided to the gate of the transistor 108 and to an enable input of the zero-crossing comparator 118. The OR gate 128 includes any suitable structure for performing logical OR operations.

The NGATE control signal is also provided to an enable input of a current limit comparator 130. The comparator 130 generates a current limit signal that is provided to the "R" input of the latch 126. The current limit signal is tripped (changes) when the inductor current $I_L$ reaches a desired maximum peak current $I_{LPK}$ when the transistor 106 is closed. In this way, the switching regulator 100 can control the peak current $I_{LPK}$ through the inductor 104.

In this example, the comparator 130 compares a sense voltage $V_{SENSE}$ to a current limit reference voltage $V_{LIMIT\_REF}$. The sense voltage $V_{SENSE}$ is generated using a current source 132 and a resistor 134. A current $I_{SENSE}$ from the current source 132 flows through the resistor 134 to generate the sense voltage $V_{SENSE}$. The current $I_{SENSE}$ is generated using a current sensor 136, which is coupled between the transistor 106 and ground. The current $I_{SENSE}$ may therefore be based on the inductor current $I_L$. The current source 132 includes any suitable structure for generating current. The resistor 134 includes any suitable resistive structure(s) having any suitable resistance. The current sensor 136 includes any suitable structure for measuring a current.

Figure 2:
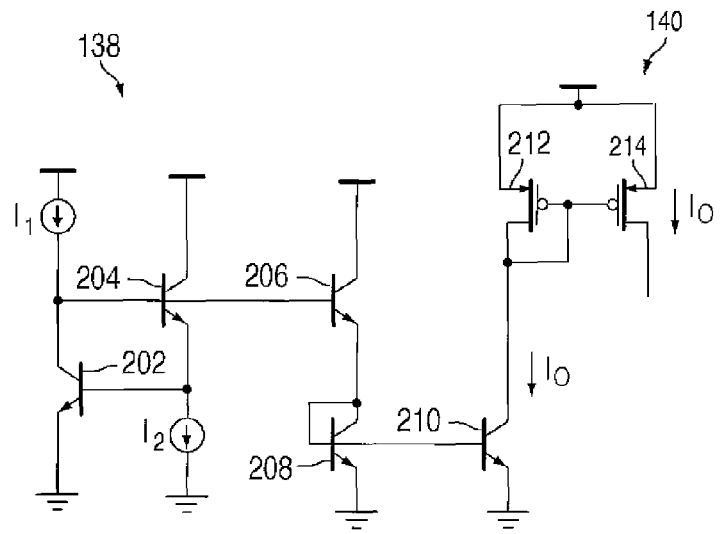
FIG. 2 illustrates an example current limit modulator for use in a switching regulator having a PFM mode of operation according to this disclosure.

The current limit reference voltage $V_{LIMIT\_REF}$ is generated using a current limit modulator 138, a current source 140, and a resistor 142. As described in more detail below, the current limit modulator 138 dynamically adjusts a current $I_O$ generated by the current source 140. The current $I_O$ flows through the resistor 142 to generate the current limit reference voltage $V_{LIMIT\_REF}$, so the current limit modulator 138 dynamically adjusts the current limit reference voltage $V_{LIMIT\_REF}$ provided to the comparator 130. The current limit modulator 138 includes any suitable structure for modulating a current limit reference value. An example embodiment of the current limit modulator 138 is shown in FIG. 2, which is described below. The current source 140 includes any suitable structure for generating current. The resistor 142 includes any suitable resistive structure(s) having any suitable resistance.

The following notations are used to describe the operation of the switching regulator 100. During operation, the transistors 106-108 are turned on one at a time. These transistors 106-108 are turned on or off in a "break-before-make scheme," meaning there is no overlapping gate drive for the transistors 106-108 (so the transistors may not be on at the same time). The amount of time during which the transistor 106 is turned on (closed) is denoted $T_{ON}$. The amount of time during which the transistor 108 is turned on is denoted $T_{OFF}$.

The amount of time during which both transistors 106-108 are turned off (opened) is denoted $T_{IDLE}$, which also represents the time during which the switching regulator 100 is in a low-power sleep state. The amount of time during which the switching regulator 100 is in an operational state may equal $T_{ON}+T_{OFF}$. The PFM repetition rate of the switching regulator 100 is denoted $T_S$, which may equal $T_{ON}+T_{OFF}+T_{IDLE}$. If $T_{IDLE}$ is much larger than $T_{ON}$ and $T_{OFF}$, $T_S$ is approximately equal to $T_{IDLE}$, and the PFM repetition rate $T_S$ is mainly governed by $T_{IDLE}$. The PFM repetition frequency is denoted $F_{PFM}$, which may equal $1/T_S$. The peak current through the inductor 104 during the $T_{ON}$ time is denoted $I_{LPK}$. The alternating current (AC) ripple present on the direct current (DC) output voltage $V_{OUT}$ is denoted $\Delta V_{OUT}$. The percentage ripple in the output voltage is defined as $\Delta V_{OUT}/V_{OUT}$.

In conventional switching regulators that support the PFM mode of operation, the percentage ripple $\Delta V_{OUT}/V_{OUT}$ can vary significantly based on changes in the input voltage $V_{IN}$ or the output voltage $V_{OUT}$. This means, for example, that different amounts of ripple $\Delta V_{OUT}$ can appear in different output voltages $V_{OUT}$. Similarly, for a given output voltage $V_{OUT}$, the output ripple can decrease over time if the input voltage $V_{IN}$ provided by the input voltage source 102 drops (which is common in batteries). These variations can cause significant problems, such as with memories or microprocessors that require specific operating voltages to function correctly. A conventional technique for overcoming this problem is to use a larger filter capacitor, but a single filter capacitor often cannot be optimized for a wide range of input and output voltages.

Significant variations can also occur in the PFM repetition frequency $F_{PFM}$ in conventional switching regulators that support the PFM mode of operation. The PFM repetition frequency $F_{PFM}$ is often a function of factors such as the input voltage $V_{IN}$, output voltage $V_{OUT}$, light load resistor 116, and filter capacitor 110. There is often no control over the PFM repetition frequency $F_{PFM}$ as the input voltage $V_{IN}$ decreases over time or as the output voltage $V_{OUT}$ varies. This means the PFM repetition frequency $F_{PFM}$ could span a large spectrum and interfere with critical applications. Filters often cannot be used to filter out the PFM repetition frequency component since the PFM frequency range is so wide.

In the example embodiment shown in FIG. 1, the switching regulator 100 supports a current-limited, forced DCM scheme with a PFM mode of operation. Moreover, the switching regulator 100 can provide a substantially stable percentage ripple $\Delta V_{OUT}/V_{OUT}$ and a substantially stable PFM repetition frequency $F_{PFM}$ over varying input and output voltages. In the particular example shown in FIG. 1, this is accomplished by dynamically adjusting the peak current $I_{LPK}$ through the inductor 104 as a function of the input voltage $V_{IN}$ and the output voltage $V_{OUT}$. This allows the switching regulator 100 to keep the percentage ripple $\Delta V_{OUT}/V_{OUT}$ substantially constant over the entire $V_{IN}$ range or the entire $V_{OUT}$ range. This also allows the switching regulator 100 to keep the idle time $T_{IDLE}$ substantially constant over the entire $V_{IN}$ range and the entire $V_{OUT}$ range, resulting in a substantially constant PFM repetition frequency $F_{PFM}$.

In some embodiments, the ripple in the output voltage $V_{OUT}$ of the switching regulator 100 could be expressed as:

$$\Delta V_{OUT} = \frac{L \times I_{LPK}^2}{2 \times C_{OUT} \times (V_{OUT} - V_{IN})} \quad (1)$$

where L represents the inductance of the inductor 104 and $C_{OUT}$ represents the capacitance of the capacitor 110. The percentage ripple of the switching regulator 100 can be expressed as:

$$\frac{\Delta V_{OUT}}{V_{OUT}} = \frac{L \times I_{LPK}^2}{2 \times C_{OUT} \times V_{OUT} \times (V_{OUT} - V_{IN})}. \quad (2)$$

The idle time $T_{IDLE}$ of the switching regulator 100 could be expressed as:

$$T_{IDLE} = \frac{L \times I_{LPK}^2 \times R_L}{2 \times V_{OUT} \times (V_{OUT} - V_{IN})} \approx T_S = \frac{1}{F_{PFM}} \quad (3)$$

where $R_L$ denotes the resistance of the resistor 116. From Equations (2) and (3), to keep $\Delta V_{OUT}/V_{OUT}$ and $T_{IDLE}$ substantially invariant over all $V_{IN}$ and $V_{OUT}$ values, the value of $I_{LPK}$ can be dynamically adjusted as follows:

$$I_{LPK}^2 \propto V_{OUT} \times (V_{OUT} - V_{IN}) \quad (4)$$

or:

$$I_{LPK} = K \times \sqrt{V_{OUT} \times (V_{OUT} - V_{IN})} \quad (5)$$

where K is a constant expressed as units of 1/Ω.

Using Equation (5), Equations (2) and (3) can be rewritten as:

$$\frac{\Delta V_{OUT}}{V_{OUT}} = \frac{L \times K^2}{2 \times C_{OUT}} \quad (6)$$

$$T_{IDLE} = \frac{L \times K^2 \times R_L}{2} \approx T_S = \frac{1}{F_{PFM}}. \quad (7)$$

In other words, if $I_{LPK}$ can be modulated as shown in Equation (5), the percentage ripple $\Delta V_{OUT}/V_{OUT}$ and the idle time $T_{IDLE}$ may be substantially or completely independent of any input voltage $V_{IN}$ and any output voltage $V_{OUT}$ as shown by Equations (6) and (7). Note that in some embodiments, L and $C_{OUT}$ are fixed, the light load resistor $R_L$ has a known value, and K can be an internal parameter defined in a particular integrated circuit device or provided as an input to the integrated circuit device.

In FIG. 1, the current limit modulator 138 provides the necessary adjustments to the peak inductor current $I_{LPK}$. More specifically, the current limit modulator 138 adjusts the current limit reference voltage $V_{LIMIT\_REF}$ by adjusting the current $I_O$ flowing through the resistor 142. This means the current limit reference voltage $V_{LIMIT\_REF}$ can be dynamically controlled. The current limit modulator 138 can adjust the current limit reference voltage $V_{LIMIT\_REF}$ based on the input and output voltages using Equation (5) above. In the example in FIG. 1, the current limit modulator 138 receives two input currents $I_1$ and $I_2$, which could equal:

$$I_1 = \frac{V_{OUT}}{R_K} \quad (8)$$

$$I_2 = \frac{V_{OUT} - V_{IN}}{R_K} \quad (9)$$

where $R_K$ denotes a resistance. In these embodiments, the current limit modulator 138 could operate to generate an output current $I_O$ that equals:

$$I_o = \sqrt{I_1 \times I_2} = \frac{1}{R_K} \sqrt{V_{OUT} \times (V_{OUT} - V_{IN})}. \quad (10)$$

The output current $I_O$ therefore varies in relation to the input and output voltages. Since the output current $I_O$ is used to control the operation of the transistor 106, the output current $I_O$ adjusts the peak inductor current $I_{LPK}$ in the same manner shown above in Equation (5).

In some embodiments, the currents $I_1$ and $I_2$ could be generated using a voltage-to-current converter 144. The voltage-to-current converter 144 in this example includes a first resistor $R_K$ that generates the current $I_1$ according to Equation (8). The voltage-to-current converter 144 also includes a summer and a second resistor $R_K$ that generate the current $I_2$ according to Equation (9). In these embodiments, at the trip point of the comparator 130, the sense current $I_{SENSE}$ equals the peak inductor current $I_{LPK}$, and the following equality can be obtained:

$$\frac{R}{R_K} \sqrt{V_{OUT} \times (V_{OUT} - V_{IN})} = I_{SENSE} \times R \quad (11)$$

assuming the resistances of the resistors 134 and 142 are equal. As a result, the peak current $I_{LPK}$ through the inductor 104 can be expressed as:

$$\left\| I_{LPK} = \frac{1}{R_K} \sqrt{V_{OUT} \times (V_{OUT} - V_{IN})} \right\|. \quad (12)$$

As noted above, with this relationship between the peak inductor current $I_{LPK}$ and the input and output voltages, the percentage ripple $\Delta V_{OUT}/V_{OUT}$ and the PFM repetition frequency $F_{PFM}$ of the switching regulator 100 could be substantially stable over varying input and output voltages.

Although FIG. 1 illustrates one example of a switching regulator 100 having a PFM mode of operation, various changes may be made to FIG. 1. For example, the functional division shown in FIG. 1 is for illustration only. Various components in FIG. 1 could be omitted, combined, or further subdivided and additional components could be added according to particular needs. Also, each component in FIG. 1 could be implemented using any suitable structure(s).

FIG. 2 illustrates an example current limit modulator 138 for use in a switching regulator 100 having a PFM mode of operation according to this disclosure. As shown in FIG. 2, the input currents $I_1$ and $I_2$ are shown as current sources (although actual current sources need not be used). The current limit modulator 138 includes five bipolar junction transistors 202-210, and the current source 140 includes two additional transistors 212-214. In this example, the bipolar junction transistors 202-210 represent NPN transistors having equal sizes, and the transistors 212-214 represent PMOS transistors.

The input current $I_1$ is sourced to the collector of the transistor 202 and to the bases of the transistors 204-206. The input current $I_2$ is sunk from the base of the transistor 202 and from the emitter of the transistor 204. The emitter of the transistor 206 is coupled to the collector and base of the transistor 208 and to the base of the transistor 210. The transistors 202-210 operate to generate a current $I_O$.

The transistor 212 has a gate and drain coupled to the collector of the transistor 210. The transistor 214 has a gate coupled to the gate of the transistor 212. The transistors 212-214 operate as current mirrors. The current $I_O$ flows through the transistor 212, and the transistor 214 mirrors that current to generate the output current $I_O$. As noted above, the output current $I_O$ could be defined as shown in Equation (10).

Although FIG. 2 illustrates one example of a current limit modulator 138 for use in a switching regulator 100 having a PFM mode of operation, various changes may be made to FIG. 2. For example, a switching regulator having a PFM mode of operation could have any other suitable current limit modulator 138 that adjusts a limit current reference voltage in an appropriate manner.

Figure 3A:
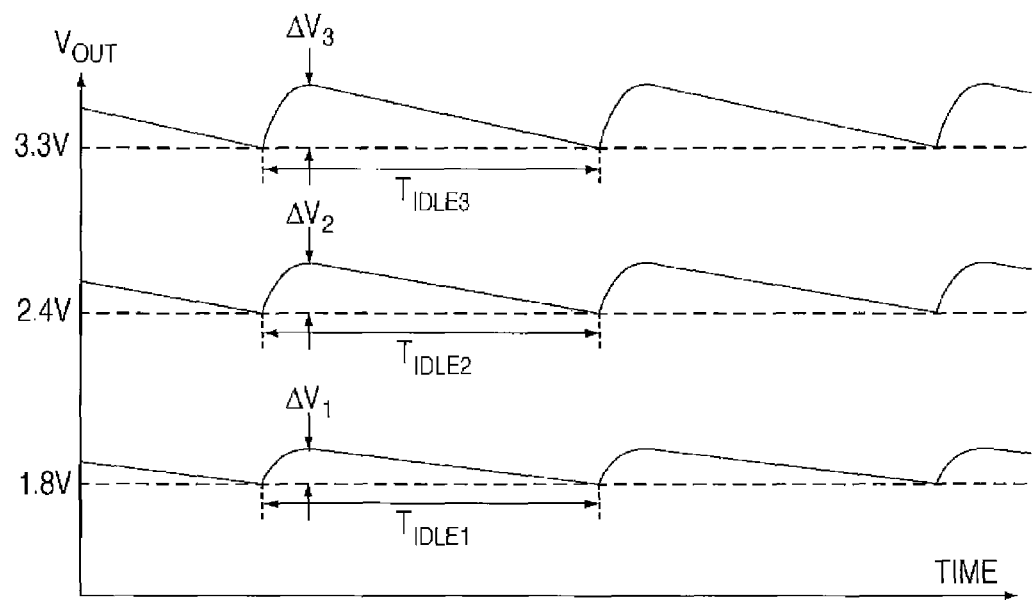
FIGS. 3A and 3B illustrate example waveforms in a switching regulator having a PFM mode of operation according to this disclosure.
Figure 3B:
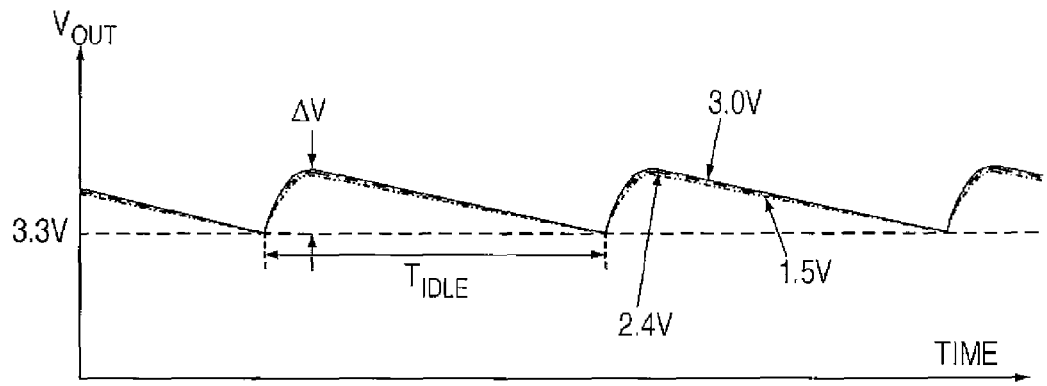

FIGS. 3A and 3B illustrate example waveforms in a switching regulator 100 having a PFM mode of operation according to this disclosure. In FIG. 3A, it is assumed that a constant input voltage $V_{IN}$ of 1.5V is received, and the light load resistor 116 is fixed and known. Three idle times $T_{IDLE1}$, $T_{IDLE2}$, and $T_{IDLE3}$ are associated with three different output voltages $V_{OUT}$ (1.8V, 2.4V, and 3.3V). As shown in FIG. 3A, the idle times remain generally constant across all three output voltage values. Also, three ripples $\Delta V_1$, $\Delta V_2$, and $\Delta V_3$ are associated with the three different output voltages $V_{OUT}$ and become larger as the output voltage $V_{OUT}$ increases. However, the percentage ripples remain generally constant across all three output voltage values (meaning $\Delta V_1/1.8V \approx \Delta V_2/2.4V \approx \Delta V_3/3.3V$).

In FIG. 3B, it is assumed that a constant output voltage $V_{OUT}$ of 3.3V is generated, and the light load resistor 116 is fixed and known. As shown in FIG. 3B, idle times $T_{IDLE}$ remain generally constant across three different input voltage values (1.5V, 2.4V, and 3.0V). Also, ripples remain relatively constant and, with the relatively constant output voltage $V_{OUT}$, generates a percentage ripple that remains generally constant across all three input voltage values.

As noted above, the percentage ripple in conventional switching regulators that support the PFM mode of operation could vary widely. In a particular conventional switching regulator, for example, the percentage ripple $\Delta V_{OUT}/V_{OUT}$ could vary between 0.35% and 3.22% over an input voltage range of 1.5V to 3.0V. This means the percentage ripple could increase ten-fold (a 900% increase). Using the technique shown in FIG. 1, the percentage ripple could vary by a much smaller amount, such as 5% or less in the same situation.

Similarly, the PFM repetition frequency $F_{PFM}$ in conventional switching regulators that support the PFM mode of operation could vary widely. In a particular conventional switching regulator, for example, the PFM repetition frequency $F_{PFM}$ could vary from 338 Hz to 2.96 kHz over an output voltage range of 1.8V to 3.3V at a given input voltage of 1.5V, a load resistance of 10 kΩ, and an output capacitance of 10 μF. Using the technique shown in FIG. 1, the PFM repetition frequency $F_{PFM}$ could vary by a much smaller amount, such as from 1.151 kHz to 1.251 kHz (a 9% variation) in the same situation.

As shown in these examples, the percentage ripple and the PFM repetition frequency may vary slightly but much less so compared to conventional switching regulators that support the PFM mode of operation. This makes the percentage ripple and the PFM repetition frequency substantially constant across the input voltage range or output voltage range. In addition, the switching regulator 100 shown in FIG. 1 may have less efficiency variation across the input voltage range or output voltage range.

The switching regulator 100 of FIG. 1 could therefore find use in a wide variety of applications, such as those that require high and consistent performance and efficiency. As a particular example, the switching regulator 100 could be used in an ultra-low input voltage, synchronous boost regulator, which could be used in conjunction with one or two "AA" batteries.

Although FIGS. 3A and 3B illustrate examples of waveforms in a switching regulator 100 having a PFM mode of operation, various changes may be made to FIGS. 3A and 3B. For example, specific values shown in FIGS. 3A and 3B and described above (such as voltages, frequencies, and percentage ripples) are for illustration only. Also, these figures merely illustrate example operations in one specific implementation of the switching regulator 100. Other switching regulators could vary in operation, such as when other or additional components are added to the switching regulator 100.

Figure 4:
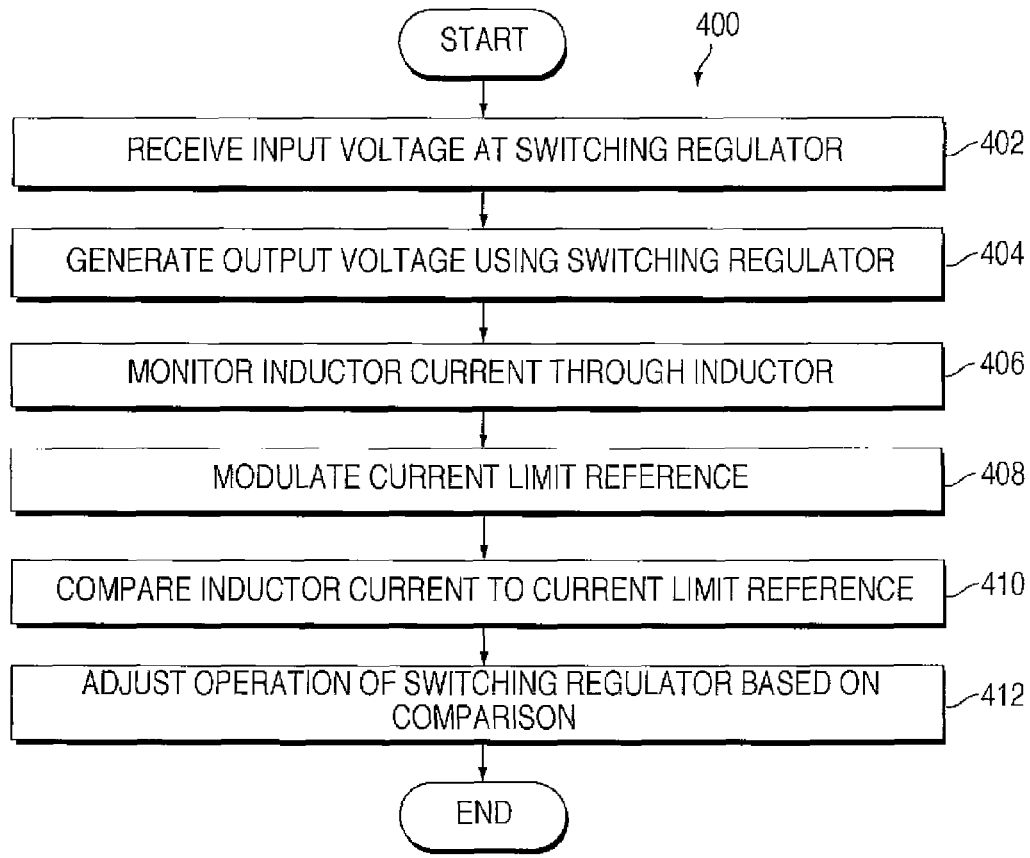
FIG. 4 illustrates an example method for switching voltage regulation using a PFM mode of operation according to this disclosure.

FIG. 4 illustrates an example method 400 for switching voltage regulation using a PFM mode of operation according to this disclosure. As shown in FIG. 4, a switching regulator receives an input voltage at step 402. This could include, for example, the switching regulator 100 receiving an input voltage $V_{IN}$ from a battery or other input voltage source 102. The switching regulator generates an output voltage at step 404. This could include, for example, the switching regulator 100 operating the transistors 106-108 to generate the output voltage $V_{OUT}$, which can be provided to a load.

During generation of the output voltage, the switching regulator monitors a current through an inductor at step 406, modulates a current limit reference at step 408, and compares the inductor current to the current limit reference at step 410. This could include, for example, the current sensor 136 measuring a current through the transistor 106 during the on-time of the transistor 106. This may also include the current source 132 providing a sense current through the resistor 134 to generate the sense voltage $V_{SENSE}$, which is proportional to the inductor current $I_L$. This may further include the current limit modulator 138 modulating the current $I_O$ generated by the current source 140 based on the input and output voltages, such as by using Equation (10) above. In addition, this may include the current source 140 providing the current $I_O$ to the resistor 142 to generate the current limit reference voltage $V_{LIMIT\_REF}$. The comparator 130 compares the sense voltage $V_{SENSE}$ and the current limit reference voltage $V_{LIMIT\_REF}$ and generates an output signal based on the comparison.

The operation of the switching regulator is adjusted based on the comparison at step 412. This could include, for example, the comparator 130 adjusting the generation of the NGATE and PGATE control signals based on the comparison between the sense voltage $V_{SENSE}$ and the current limit reference voltage $V_{LIMIT\_REF}$. By modulating the generation of the current limit reference voltage $V_{LIMIT\_REF}$, the percentage ripple and the PFM repetition frequency of the switching regulator can be substantially independent of the input and output voltages.

Although FIG. 4 illustrates one example of a method 400 for switching voltage regulation using a PFM mode of operation, various changes may be made to FIG. 4. For example, while shown as a series of steps, various steps in FIG. 4 could overlap, occur in parallel, occur in a different order, or occur multiple times. As a specific example, receipt of the input voltage and generation of the output voltage can overlap. As another specific example, steps 406-412 could occur while the input voltage is being received and the output voltage is being generated.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving an input voltage at a voltage regulator, the voltage regulator comprising an inductor;
   generating an output voltage using the voltage regulator;
   controlling a current through the inductor using a current limit reference; and
   modulating the current limit reference based on the input voltage and the output voltage,
   wherein modulating the current limit reference comprises:
      generating a reference current, the current limit reference based on the reference current; and
      modulating the reference current based on the input and output voltages,
   and wherein:
   the reference current is based on a product of a first input current and a second input current
   the first input current is based on the output voltage; and
   the second input current is based on the input and output voltages,
   the first input current is based on the output voltage;
   the second input current is based on a difference between the output voltage and the input voltage; and
   the reference current is based on a square root of a product of (i) the output voltage and (ii) the difference between the output voltage and the input voltage.

2. The method of claim 1, wherein generating the output voltage comprises opening and closing:
   a first switch coupled to the inductor and to ground; and
   a second switch coupled to the inductor and to an output where the output voltage is provided.

3. The method of claim 2, wherein controlling the current through the inductor comprises:
   generating a sense signal based on the current through the inductor when the first switch is closed and the second switch is opened; and
   comparing the sense signal to the current limit references.

4. The method of claim 1, wherein:
   the voltage regulator operates in a pulse frequency mode;
   the pulse frequency mode is associated with a repetition rate;
   the output voltage is associated with a percentage ripple; and
   the repetition rate and the percentage ripple are substantially constant over variations in the input voltage and variations in the output voltage.

5. A voltage regulator comprising:
   first circuitry configured to receive an input voltage and generate an output voltage, the first circuitry comprising an inductor; and
   second circuitry configured to control a current through the inductor using a current limit reference, the second circuitry comprising circuitry configured to modulate the current limit reference based on the input voltage and the output voltage,
   wherein the circuitry configured to modulate the current limit reference comprises:
   a current source configured to generate a reference current, the current limit reference based on the reference current; and
   a modulator configured to modulate the reference current based on the input and output voltages,
   wherein the current source is configured to generate the reference current such that the reference current is based on a product of a square root of a first input current and a second input current, the first input current based on the output voltage, the second input current based on the input and output voltages.

6. The voltage regulator of claim 5, wherein the first circuitry further comprises:
   a first switch coupled to the inductor and to ground; and
   a second switch coupled to the inductor and to an output where the output voltage is provided.

7. The voltage regulator of claim 6, wherein the second circuitry further comprises:
   circuitry configured to generate a sense signal based on the current through the inductor when the first switch is closed and the second switch is opened; and
   a comparator configured to compare the sense signal to the current limit reference.

8. The voltage regulator of claim 5, wherein the modulator comprises:
   a first bipolar transistor having a collector coupled to the first input current;
   a second bipolar transistor having (i) a base coupled to the first input current and (ii) an emitter coupled to a base of the first bipolar transistor and to the second input current;
   a third bipolar transistor having a base coupled to the first input current;
   a fourth bipolar transistor having a collector and a base coupled to an emitter of the third bipolar transistor; and
   a fifth bipolar transistor having a base coupled to the base and the collector of the fourth bipolar transistor.

9. The voltage regulator of claim 8, wherein the current source comprises:
   a first transistor having a gate and a drain coupled to a collector of the fifth bipolar transistor; and
   a second transistor having a gate coupled to the gate of the first transistor, the second transistor configured to generate the reference current.

10. The voltage regulator of claim 5, further comprising:
    a voltage-to-current converter configured to generate the first and second input currents;
    wherein the first input current is based on the output voltage;
    wherein the second input current is based on a difference between the output voltage and the input voltage; and
    wherein the reference current is based on a square root of a product of (i) the output voltage and (ii) the difference between the output voltage and the input voltage.

11. The voltage regulator of claim 5, wherein:

the voltage regulator is configured to operate in a pulse frequency mode;

the pulse frequency mode is associated with a repetition rate;

the output voltage is associated with a percentage ripple; and the second circuitry is configured to modulate the current limit reference such that the repetition rate and the percentage ripple are substantially constant over variations in the input voltage and variations in the output voltage.

12. A system comprising:

an input voltage source configured to provide an input voltage; and a voltage regulator comprising:

first circuitry configured to receive an input voltage and generate an output voltage, the first circuitry comprising an inductor;

second circuitry configured to control a current through the inductor using a current limit reference, the second circuitry comprising circuitry configured to modulate the current limit reference based on the input voltage and the output voltage, the second circuitry further comprises a comparator configured to compare a sense signal associated with the current through the inductor to the current limit reference; and the circuitry configured to modulate the current limit reference comprises:

a current source configured to generate a reference current, the current limit reference based on the reference current;

a modulator configured to modulate the reference current based on the input and output voltages a voltage-to-current converter configured to generate first and second input currents, the modulator configured to modulate the reference current based on the first and second input currents;

wherein the first input current is based on the output voltage;

wherein the second input current is based on a difference between the output voltage and the input voltage; and wherein the reference current is based on a square root of a product of (i) the output voltage and (ii) the difference between the output voltage and the input voltage.

13. The system of claim 12, wherein:

the voltage regulator is configured to operate in a pulse frequency mode;

the pulse frequency mode is associated with a repetition rate;

the output voltage is associated with a percentage ripple; and the second circuitry is configured to modulate the current limit reference such that the repetition rate and the percentage ripple are substantially constant over variations in the input voltage and variations in the output voltage.

* * * * *